July 2, 1957  L. E. TARBOX  2,798,136
ELECTRICAL SWITCH DEVICE
Filed May 14, 1954
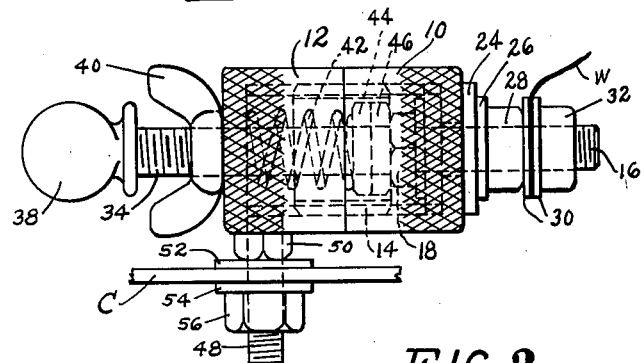
FIG. 1
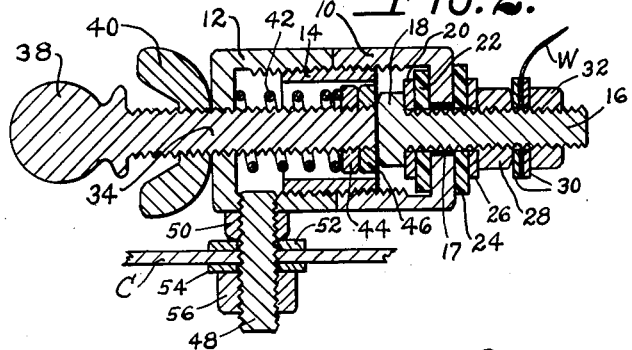
FIG. 2.
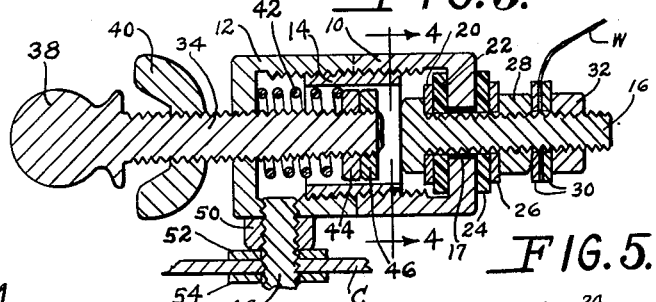
FIG. 3.
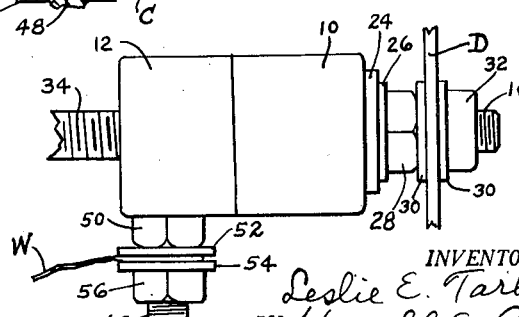
FIG. 4.
FIG. 5.
INVENTOR.
Leslie E. Tarbox
BY Harold E. Cole
Attorney

2,798,136

2,798,136

ELECTRICAL SWITCH DEVICE

Leslie E. Tarbox, Malden, Mass., assignor of seventeen and one-half percent to Angela M. Marzeoti, Medford, Mass.

Application May 14, 1954, Serial No. 429,830

3 Claims. (Cl. 200—158)

This invention relates to an electrical switch device, particularly one that is adapted to be attached to the ground wire of an electrical system.

One object of my invention is to provide such a switch device that will be suitable for use on traveling vehicles which are subject to considerable vibration, and quick starts and stops, such as an automobile or public vehicle driven over the road or on rails, or an airplane.

Another objective of my invention is to provide such a switch device with adjustable means for tightening the contact members to the extent desired to assure full conduction of electricity from one said contact member to the other.

A further object is to provide such a device with means whereby said contact members can quickly be separated by simple hand movements, to thereby open the circuit through my device, as in an emergency such as occurs when a short circuit develops in the electrical system or the vehicle gets afire.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

Figure 1 is a side elevational view of my switch device showing the contact members in closed position, and my device attached, at one side to an automobile chassis.

Figure 2 is a longitudinal sectional view of my switch device, as shown in Figure 1.

Figure 3 is a longitudinal sectional view of my switch device similar to Figure 2; but with the contact members in open position.

Figure 4 is a sectional view taken on the line 4—4 of Figure 3.

Figure 5 is a side elevational view of my device shown attached to an automobile dash at one end.

As illustrated, my device has a housing which has a section 10, interiorly screw-threaded, and another section 12 also interiorly screw-threaded. A connector 14, shown as an exteriorly screw-threaded nipple extends into the interior of said sections 12 and 14 and screw-threadedly connects therewith to removably join these housing sections.

A conductor member 16 movably extends from outside said housing section 10 movably through a hole in the latter into the interior thereof, being shown as an elongate bolt having a larger portion or head 18 within said section 10. An insulator collar 17 in said housing section hole spaces it from said conductor member 16. Next to and inwardly of said head 18 is a metal washer 20 and next thereto is a larger insulator washer 22, both being on said conductor member 16 within said section 10.

At the outside of said section 10 is an insulator washer 26 on said conductor member 16, next thereto is a metal washer 26 and then a nut 28 screw-threadedly connects with said conductor member 16. Next are two holding members or metal washers 30 which, in use, are spaced apart sufficiently to receive and tightly hold an electricity conducting wire between them. Or when this end of my device is attached to the dash D of a vehicle, for instance, as shown in Figure 5 of the drawings, these two holding members or metal washers 30 can hold my device to said dash D, which latter serves as a ground for the wire W. Beyond said washers 30 is a nut 32 screw-threadedly connected to said conductor member 16 and which holds said retaining washers 30 in functioning position.

Connected to said other housing section 12 is a conductor member 34 in the form of an elongate bolt which has a knob 38 at one end, and on which a locking member shown as a wing nut 40 is screw-threadedly mounted outside of said section 12. This conductor member 34 screw-threadedly connects with said section 12 and extends into the interior thereof and contacts the wider head 18 of the other conductor member 16 when in position to conduct electricity as shown in said Figure 2.

A coil spring 42 is within said housing section 12 and bears against the interior thereof at one end while the other end bears against a bearing member 44 shown as a nut in screw-threaded engagement with said conductor member 34. Another nut 46 bears against the nut 44 to serve as a lock member, and preferably the inner end of said conductor member 16 extends beyond said locking nut 44. This spring 42 serves to hold said conductor member 34 firmly in any desired position, avoiding looseness thereof and too free movement.

Extending from one side of said housing section 12 is a conductor member 48 which is held in fixed position by a lock nut 50 on the latter which bears against the section 12. A holding member or washer 52 is next to said nut 50 while spaced from the latter is another holding member or washer 54, which latter two washers have a part of the chassis C of the automobile between them, as shown in said Figure 3, or a wire W, as shown in said Figure 5.

My device is particularly adapted to serve as a switch between the source of electricity, such as a battery, and the ground, and on a motor vehicle or the like it would be connected to the chassis thereof or to the dash, or other suitable part thereof that would serve as a ground. Ordinarily the ground wire W would be connected at one end of my device as shown in Figure 2, or at the side thereof as shown in said Figure 5. With said contact members 16 and 34 together, as shown in said Figure 2, the electrical circuit to the ground is closed; but in case of a short circuit becoming known or some other electrical disturbance, all one needs do, is to unscrew said contact member 34 away from said contact member 16, so the circuit is open as shown in said Figure 3. When a wing nut 40 is used, which is desirable to hold the contact member 34 tight, as when the vibration is great, this wing nut must be loosened and then the contact member 34 screwed away from said contact member 16.

What I claim is:

1. A switch device comprising a housing embodying two sections, a connector member to connect said sections, a contact member mounted in a first said section and extending outside, means to hold said contact member in said mounted position, two holding members mounted on said contact member outside said section, means to hold said holding members in said mounted position, another contact member movably mounted in the other said section and extending outside, means to hold said other contact member in said mounted position embodying a bearing member thereon, a coil spring bearing against an interior portion of said other said section and against said bearing member, said other contact member being so positioned within said other section that it may be moved into contact with or away from said first contact member, and holding means attached to said housing embodying a conductor member, and adapted to attach said device to an external member.

2. A switch device comprising a housing embodying two sections, a connector member to connect said sections, a contact member mounted in a first said section and extending outside, means to hold said contact member in said mounted position, two holding members mounted on said contact member outside said section, means to hold said holding members in said mounted position, another contact member movably mounted in the other said section and extending outside, a locking member movably mounted on said other contact member outside said other section and adapted to bear against the latter, means to hold said other contact member in said mounted position embodying a bearing member thereon, a coil spring bearing against an interior portion of said other said section and against said bearing member, said other contact member being so positioned within said other section that it may be moved into contact with or away from said first contact member, and holding means attached to said housing, embodying a conductor member, and adapted to attach said device to an external member.

3. A switch device comprising a housing embodying two sections, a connector member adapted to extend into and connect both said sections, an elongate contact member mounted in a first said section and extending outside, means to hold said contact member in said mounted position, another contact member movably mounted in the other said section and extending outside and being exteriorly screw-threaded, means to hold said other contact member in said mounted position embodying a bearing member movably mounted thereon, a locking nut screw-threadedly mounted on said other contact member outside said other section and adapted to bear against the latter, a coil spring bearing against an interior portion of said other section and against said bearing member, said other contact member being so positioned within said other section that it may be moved into contact with or away from said first contact member, and holding means attached to said housing, embodying a conductor member, and adapted to attach said device to an external member.

References Cited in the file of this patent
UNITED STATES PATENTS

| | | |
|---|---|---|
| 1,911,739 | Bangston | May 30, 1933 |
| 2,605,314 | Schelke | July 29, 1952 |
| 2,674,674 | Rietschel | Apr. 6, 1954 |